United States Patent
Kitamura et al.

(10) Patent No.: US 6,814,800 B2
(45) Date of Patent: Nov. 9, 2004

(54) METHOD FOR TREATING PHOTOREFRACTIVE EFFECT OF AN OPTICAL DEVICE AND PHOTOREFRACTIVE EFFECT-SUPPRESSED OPTICAL FREQUENCY CONVERSION DEVICE

(75) Inventors: Kenji Kitamura, Tsukuba (JP); Shunji Takekawa, Tsukuba (JP); Masaru Nakamura, Tsukuba (JP); Sunao Kurimura, Tsukuba (JP)

(73) Assignee: National Institute for Materials Science, Tsukuba (JP)

(*) Notice: Subject to any disclaimer, the term of this patent is extended or adjusted under 35 U.S.C. 154(b) by 88 days.

(21) Appl. No.: 10/379,803

(22) Filed: Mar. 6, 2003

(65) Prior Publication Data

US 2004/0173138 A1 Sep. 9, 2004

(51) Int. Cl.[7] .................................................. C30B 1/00
(52) U.S. Cl. ............................................. 117/2; 117/3
(58) Field of Search ........................................... 117/2, 3

(56) References Cited

U.S. PATENT DOCUMENTS 6,686,676 B2 * 2/2004 McNulty et al. ............ 313/112
6,723,435 B1 * 4/2004 Horne et al. ................ 428/432

FOREIGN PATENT DOCUMENTS

JP          05270993 A   * 10/1993

* cited by examiner

Primary Examiner—Felisa Hiteshew
(74) Attorney, Agent, or Firm—Oblon, Spivak, McClelland, Maier & Neustadt, P.C.

(57) ABSTRACT

A method for treating a photorefractive effect of an optical device, which comprises irradiating an optical device comprising a lithium niobate single crystal or a lithium tantalate single crystal with an ultraviolet light having a wavelength of at least 300 nm and at most 400 nm so as to suppress and control a photo-induced refractive index change (photorefractive effect) caused on the device.

15 Claims, 8 Drawing Sheets

QUASI-PHASE-MATCHING FREQUENCY CONVERSION METHOD TO AVOID PHOTOREFRACTIVE EFFECT (NO. 1)

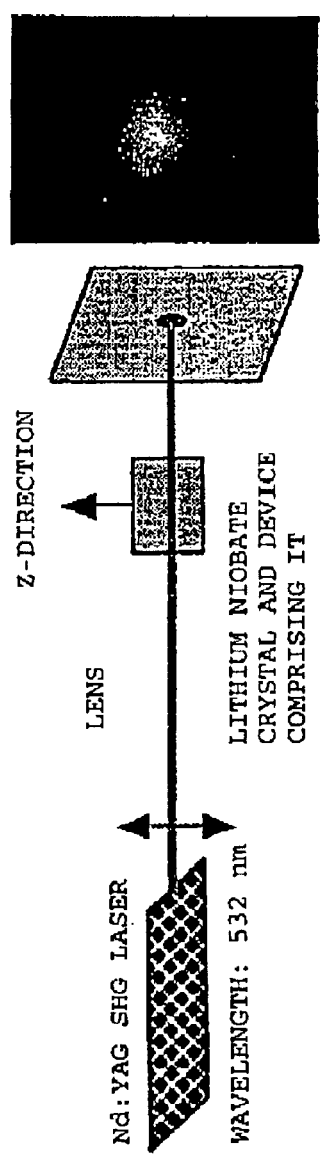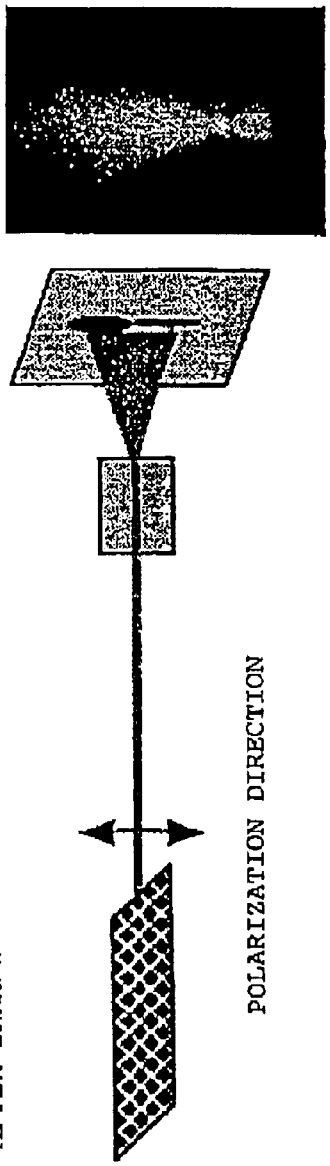

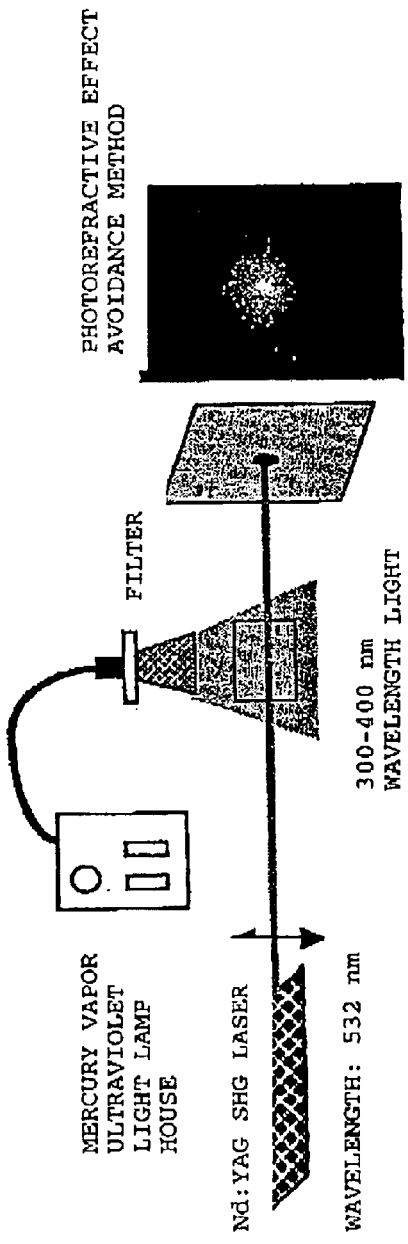
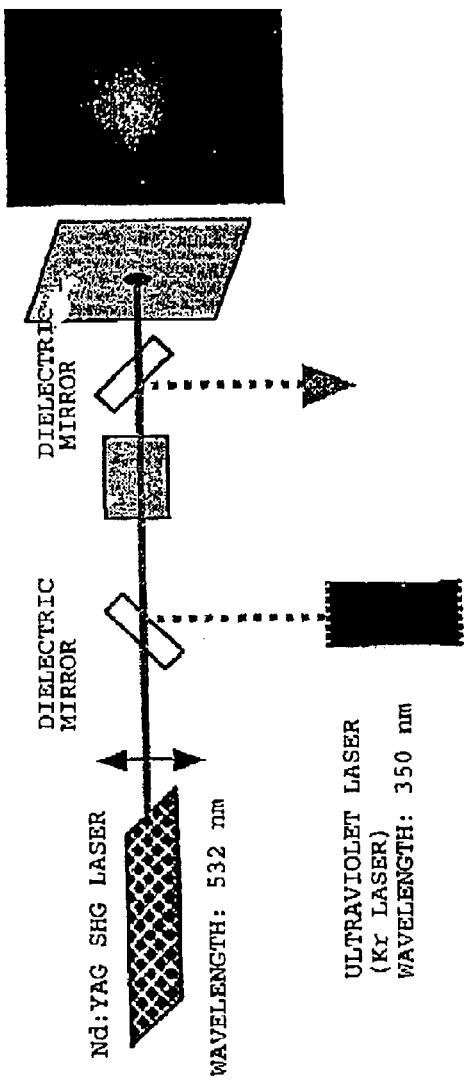
Fig. 2(1) IRRADIATION OF CRYSTAL WITH ULTRAVIOLET LIGHT
Fig. 2(2) ULTRAVIOLET LASER BEAM IS MADE TO OVERLAP WITH OPTICAL PATH QUASI-PHASE-MATCHING FREQUENCY CONVERSION METHOD TO AVOID PHOTOREFRACTIVE EFFECT (NO. 1)

CHANGE IN FREQUENCY CONVERSION EFFICIENCY BY IRRADIATION WITH ULTRAVIOLET LIGHT

QUASI-PHASE-MATCHING FREQUENCY CONVERSION METHOD TO AVOID PHOTOREFRACTIVE EFFECT (NO. 3)

QUASI-PHASE-MATCHING FREQUENCY CONVERSION METHOD TO AVOID PHOTOREFRACTIVE EFFECT (NO. 4)

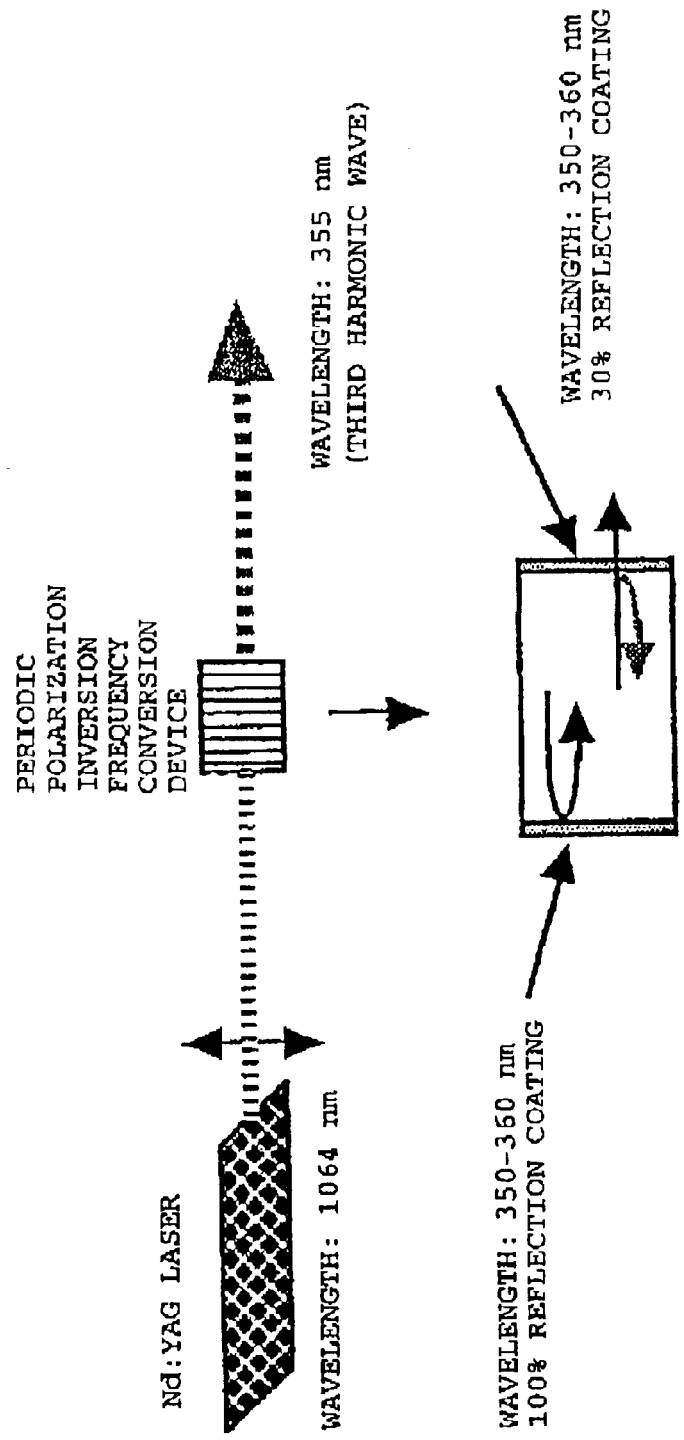

METHOD FOR TREATING PHOTOREFRACTIVE EFFECT OF AN OPTICAL DEVICE AND PHOTOREFRACTIVE EFFECT-SUPPRESSED OPTICAL FREQUENCY CONVERSION DEVICE

BACKGROUND OF THE INVENTION

1. Field of the Invention

The present invention relates to a method for treating an optical device comprising a lithium niobate single crystal or a lithium tantalate single crystal, particularly a treatment method with a purpose of recovering functions of an optical device of which functions are decreased by photorefractive effect (optical modulation), and an optical device of which functions are recovered, obtained by the above treatment method. Further, the present invention relates to an optical frequency conversion (optical modulation) method using an optical device having polarization inversion formed thereon, which comprises generating an oscillation light having a specific wavelength and returning it to the optical device thereby to recover functions of the optical device, and an optical device set to obtain a light having a specific wavelength,

2. Discussion of Background

A lithium niobate single crystal and a lithium tantalate single crystal have high electro-optical effect and non-linear effect, whereby they have attracted attention as useful optically functional materials to be used to design various optically functional devices such as optical modulators and frequency conversion devices. In recent years, studies and development on frequency conversion devices and electro-optical devices having ferroelectric polarization inverted periodically or in a specific shape on these materials have been actively carried out.

Particularly in recent years, development as a high level optical frequency conversion device has been expected and attracted attention. For example, an attempt to achieve second harmonic oscillation to convert a laser beam in the near infrared wavelength region (fundamental wavelength: 1064 nm=1.064 μm) to a green light having a half wavelength (532 nm), and an attempt to obtain a blue light by setting the fundamental wavelength and the polarization inversion periodic cycle to be shorter, and further, an attempt to achieve third harmonic oscillation to convert the above fundamental wavelength beam to a light having a wavelength one third of the fundamental wavelength (355 nm) by setting the polarization inversion periodic cycle to be very short, may be mentioned.

However, in order to positively utilize an optical device designed based on such a single crystal, "photorefractive effect" has to be overcome. The photorefractive effect is defined as such a phenomenon that a refractive index change resulting from photoelectromotive force appears in the crystal when the crystal is irradiated with an intense light such as a laser beam. The result of this phenomenon is considered that as the light strikes the crystal not entirely but locally, deviation in charge density arises, whereby the crystal is naturally in such a state that an electric field is applied thereto. Namely, the phenomenon is considered to be due to a change in refractive index in the crystal by an electro-optical effect when an electric field is applied to a lithium niobate or lithium tantalate single crystal.

In any case, if an optical device undergoes such a photorefractive effect, even if frequency conversion is tried, the frequency conversion efficiency extremely decreases, and matching properties are lost, whereby oscillation may not take place, or the laser beam mode will be remarkably poor.

Accordingly, it is inevitable to overcome this problem of the photorefractive effect in order to increase usefulness of the optical device, particularly to proceed development of frequency conversion technique to obtain a coherent light based on quasi-phase-matching with polarization inversion formed, particularly oscillation technology regarding a green light and a blue light in the visible region and further, ultraviolet rays exceeding said region. Means to overcome this problem have already been published and proposed in literatures, and carried out also.

Namely, R. L. Byer, Y. K. Park, R. S. Feigelson and W. L. Kway: "Applied Physics Letters" vol. 39 (1981) p. 17 discloses that an optical device comprising a single crystal is heated to from 100 to 200° C. to increase the electric conductivity of the crystal, thereby to resolve the photorefractive effect.

Further, D. A. Bryan, R. Gerson and H. E. Tomaschke: "Applied Physics Letters" vol. 44 (1984) p. 847 and Y. Furukawa, K. Kitamura, S. Takekawa, A. Miyamoto, M. Terao and N. Suda: "Applied Physics Letters" vol. 77 (2000) p. 2494 disclose addition of MgO to a single crystal, and T. R. Volk, V. I. Pryalkin and N. M. Rubinina: "Optics Letters" vol. 15 (1980) p. 996 discloses addition of ZnO to a single crystal, respectively, to increase the optical conductivity so that no photorefractive effect will be caused.

In association with this, the present inventors have developed a lithium niobate single crystal and a lithium tantalate single crystal, having a composition constituting the crystal boundlessly close to a stoichiometric composition, and a method for growing these single crystals, and proposed that the amount of MgO or ZnO can be considerably reduced by the method as compared with a conventional technique, and have filed a Patent Application.

However, there are still problems remaining regarding the conventional means to resolve photorefractive effect. Namely, the means of heating the crystal device to 200° C. costs itself, and design and control of an apparatus for it are by no means easy, and adequate countermeasure is required taking impact on other equipment and apparatus including the optical frequency conversion device into consideration, and it has a drawback in view of miniaturization of the apparatus. Further, the latter means of adding MgO or ZnO can be evaluated to a certain extent from such a viewpoint that the photorefractive effect is less likely to occur as compared with a case of no addition, however, growth of a homogeneous single crystal and processing tend to be difficult, and in addition, the photorefractive effect can be by no means basically prevented with this method alone, and the means has been limited to a certain range of use.

In addition, the photorefractive effect is less likely to occur on a ferroelectric single crystal used in the present invention in a long wavelength region at the time of optical frequency conversion, whereas in the ultraviolet region with a wavelength shorter than 300 nm, the crystal itself undergo extreme degeneration, loses transparency, thereby can not be used as an optically functional material. Thus, the wavelength of the light to be used for the optical device designed to comprise such a single crystal is considerably limited, particularly in the wavelength region with a short wavelength of at most 400 nm, a remarkably intense photorefractive effect occurs, and application of light having a wavelength in this region itself, including irradiation and oscillation, is commonly considered to be unreasonable.

On the other hand, increase of a usable wavelength region has been required, and a blue light having a short wavelength for example is highly needed in fact.

SUMMARY OF THE INVENTION

Under these circumstances, the present invention has been made to overcome the above problems. Namely, the conventional means of suppressing and controlling the photorefractive effect itself is problematic and is insufficient from the above various viewpoints, and it is an object of the present invention to provide a means to easily and securely suppress the photorefractive effect with no such a problem. In addition, it is an object of the present invention to realize and achieve stably controlled optical frequency conversion and optical modulation in a short wavelength region, at which use of the optical device has conventionally been considered to be difficult, without a photorefractive effect.

The present inventors have conducted extensive studies and as a result, have basically gotten hold of the problem of the photorefractive effect. In order to discover a clue in solving the problems, they have conducted measurement regarding the wavelength dependency of the photorefractive effect. As a result, it was found that the photorefractive effect becomes more significant when the wavelength becomes shorter, under irradiation with light in a wavelength region longer than 400 nm. In experiments, a significant photorefractive effect was observed with a light of 408 nm. On the other hand, in a further shorter wavelength region, surprisingly, a remarkable increase in the photoconductivity (electric conductivity under light irradiation) of the crystal was observed. Namely, a fact which denies the concept that the optical device cannot be used at this range, is brought in this regard. From experimental results, it was found that the photorefractive effect is suppressed by irradiation with a light having a wavelength of 350 nm. From these discoveries, it was found that when a crystal or a device is uniformly irradiated with a ultraviolet light having a wavelength at a level of 350 nm, the photorefractive effect can be suppressed without heating the crystal, at the time of frequency conversion in a wavelength region longer than 400 nm, i.e. in a region in which the photorefractive effect is likely to occur.

Further, frequency conversion to an ultraviolet light by quasi-phase-matching by periodic polarization inversion of a lithium niobate single crystal or a lithium tantalate single crystal, has conventionally been considered to be difficult, since the photorefractive effect tends to be significant when a light having a short wavelength is employed. However, as a result of experiments, the present inventors have succeeded in oscillation of third harmonic wave (wavelength: 352 nm) of a fundamental light (wavelength: 1,064 μm) of Nd:YAG laser, by appropriately adjusting the polarization inversion periodic cycle of the device. Namely, it was found that a short wavelength can satisfactorily be obtained.

It was further found that by allocating and reducing a part of the light having a specific wavelength (third harmonic wave) obtained by the above-described means to the device again on the spot, i.e. by returning the oscillated specific wavelength light to the device, the photorefractive effect which is gradually caused by incidence of a fundamental wave in quasi-phase-matching can self-supportingly be suppressed, that is, optical frequency conversion and optical modulation in a wavelength region in which they are hardly be carried out due to the photorefractive effect, can persistently and stably be controlled.

The present invention has been made on the basis of these important discoveries.

Namely, the present invention is to provide a means to securely resolve and prevent the photorefractive effect by irradiating an optical device with a light having a specific wavelength, based on a principle totally different from a conventional one, which is novel and useful as compared with a conventional means such as heating. The present invention further provides a method for treating a photorefractive effect of an optical device based on the above means, including optical frequency conversion, a function-recovered optical device treated thereby, a photorefractive effect-suppressed optical frequency conversion (optical modulation) method and a photorefractive effect-suppressed optical device to be used for the method.

BRIEF DESCRIPTION OF THE DRAWINGS

FIGS. 1(1) and 1(2) are diagrams illustrating a photorefractive effect.

FIGS. 2(1) and 2(2) are diagrams illustrating embodiments of recovery from a photorefractive effect.

FIG. 8 is a diagram illustrating an embodiment of an optical frequency conversion method by quasi-phase-matching to avoid a photorefractive effect (No. 5).

DETAILED DESCRIPTION OF THE PREFERRED EMBODIMENTS

Figure 3:
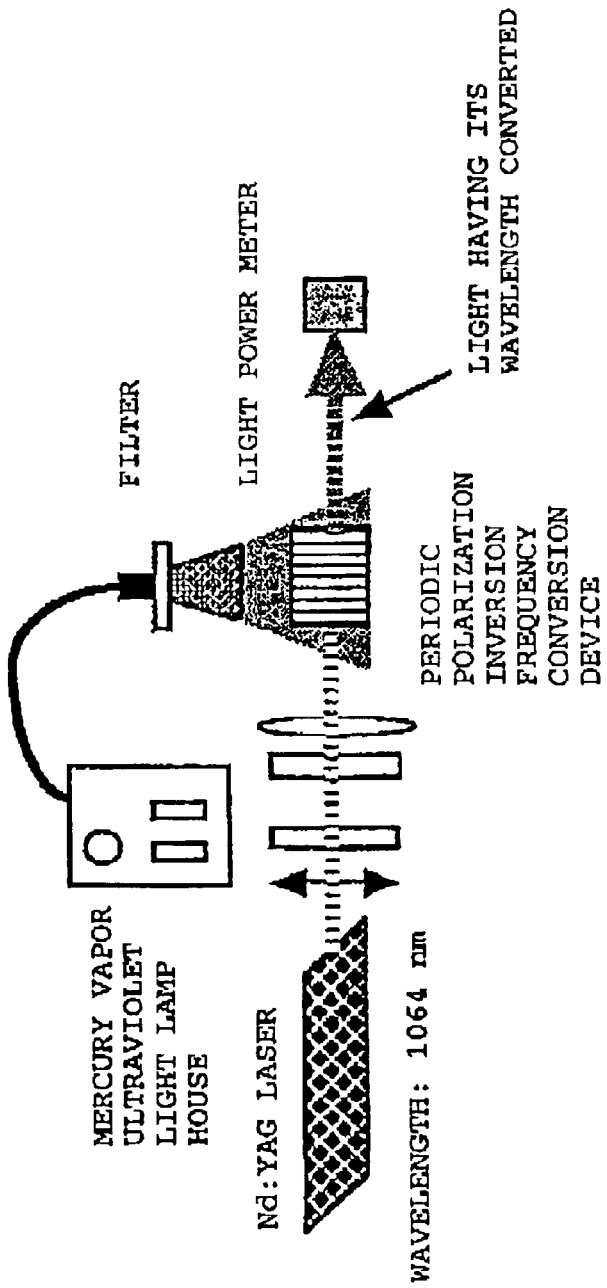
FIG. 3 is a diagram illustrating an embodiment of an optical frequency conversion method by quasi-phase-matching to avoid a photorefractive effect (No. 1).

As the applications of the present invention, various applications of an optical device, i.e. applications of an optical device regarding a method of use and applications of an optical device to be subjected to a method of use can be conceivable, and thus the applications of an optical device are limited to the above novel means to resolve the photorefractive effect, which is the subject matter of the present invention, i.e. the practical means of the present invention.

Namely, the practical means of the present invention resides in the following items (1) to (15). They are roughly classified into the following four categories (i) to (iv).

Namely, the present invention is roughly classified into a category (i) comprising a method for treating a photorefractive effect of an optical device, as defined by a practical means (1) and practical means (2) to (4) to which the means (1) is limited, a category (ii) comprising a function-recovered optical device as defined by a practical means (5) and practical means (6) and (7) to which the means (5) is limited, a category (iii) comprising a photorefractive effect-suppressed optical frequency conversion (optical modulation) method as defined by a practical means (8) and practical means (9) to (12) to which the practical means (8) is limited, and a category (iv) comprising a photorefractive effect-suppressed optical frequency conversion (optical modulation) device as defined by a practical means (13) and practical means (14) and (15) to which the practical means (13) is limited.

(i) The first practical means resides in (1) a method for treating a photorefractive effect of an optical device, which comprises irradiating an optical device comprising a lithium niobate single crystal or a lithium tantalate single crystal with an ultraviolet light having a wavelength of at least 300 nm and at most 400 nm so as to suppress and control a photo-induced refractive index change (photorefractive effect) caused on the device.

The reason why the wavelength of light to be irradiated is at least 300 nm and at most 400 nm is that the photorefractive effect suppression effect can be obtained in this wavelength region, and in addition, if it is less than 300 nm, the light will not pass through the crystal since it is significantly absorbed, that is, no effect of suppressing the photorefractive effect can be obtained, and if the wavelength exceeds 400 nm, not only no photorefractive effect suppression effect can be expected but also the photorefractive effect tends to be rather significant. Thus, the wavelength is at least 300 nm and at most 400 nm.

Now, the second and subsequent practical means are shown below.

(2) The method for treating a photorefractive effect, wherein the optical device comprising a lithium niobate single crystal or a lithium tantalate single crystal is a device containing MgO or ZnO.

MgO and ZnO are known addition components for an optical device comprising the above single crystal as described above, and this item is to indicate that the present invention includes a case where these components are added.

(3) The method for treating a photorefractive effect, wherein the optical device comprising a lithium niobate single crystal or a lithium tantalate single crystal it a device to be subjected to optical frequency conversion or optical modulation.

The above method of treating a photorefractive effect is not targeted only at specific products in specific fields, such as optical frequency conversion or optical conversion process in communication technology, since the optical technology according to the present invention is to be used in various technical fields. Needless to say, an optical frequency conversion method and an optical modulation method are included therein.

(4) The method for treating a photorefractive effect, wherein the optical device comprising a lithium niobate single crystal or a lithium tantalate single crystal is an optical frequency conversion device which has periodic polarization-inverted structures, by which optical frequency conversion is carried out by quasi-phase-matching.

This is to indicate that the method for treating a photorefractive effect is specifically carried out by using a frequency conversion device by quasi-phase-matching.

(ii) (5) A function-recovered optical device comprising a lithium niobate single crystal or a lithium tantalate single crystal, wherein a photo-induced refractive index change (photorefractive effect) is suppressed by irradiation with an ultraviolet light having a wavelength of at least 300 nm and at most 400 nm, whereby lost optical device functions are recovered.

(6) The function-recovered optical device according to the above item (5), wherein the optical device comprising a lithium niobate single crystal or a lithium tantalate single crystal is a device containing MgO or ZnO.

(7) The function-recovered optical device according to the above item (5) or (6), wherein the optical device comprising a lithium niobate single crystal or a lithium tantalate single crystal is a device having periodic polarization-inverted structures formed thereon, to carry out optical frequency conversion (optical modulation) by quasi-phase-matching.

(iii) (8) A photorefractive effect-suppressed optical frequency conversion (optical modulation) method, which comprises using an optical frequency conversion (optical modulation) device comprising a lithium niobate single crystal or a lithium tantalate single crystal and having periodic polarization-inverted structures formed thereon, to carry out optical frequency conversion (optical modulation) by quasi-phase-matching, wherein frequency conversion (optical modulation) conditions are set so that oscillation wave in the ultraviolet region of at most 400 nm are obtained, and a part of the obtained oscillation lights of at most 400 nm are returned to the device, thereby to suppress and control the photorefractive effect.

(9) The photorefractive effect-suppressed optical frequency conversion (optical modulation) method according to the above item (8), wherein the optical frequency conversion (optical modulation) device is a device containing MgO or ZnO.

(10) The photorefractive effect-suppressed optical frequency conversion (optical modulation) method according to the above item (8) or (9), wherein the means to return the ultraviolet lights of at most 400 nm to the device is a dielectric mirror or a reflection mirror coating formed on the device.

(11) The photorefractive effect-suppressed optical frequency conversion (optical modulation) method according to any one of the above items (8) to (10), wherein the frequency conversion conditions set so that ultraviolet lights of at most 400 nm are obtained, axe determined by selecting periodic polarization-inverted structures of the device to be used and the fundamental wavelength.

(12) The photorefractive effect-suppressed optical frequency conversion (optical modulation) method according to the above item (11), wherein the mode of the optical frequency conversion (optical modulation) is such that a laser beam of 1,064 nm is employed as a fundamental wave, the oscillation wave is a ultraviolet light having a wavelength of 354 nm which is one third of the fundamental wave, and the optical frequency conversion (optical modulation) device to be used therefor is a device having polarization-inverted structures formed in a periodic cycle of from 2 to 3 $\mu$m.

(iv) (13) A photorefractive effect-suppressed optical frequency conversion (optical modulation) device comprising a lithium niobate single crystal or a lithium tantalate single crystal and having periodic polarization-inverted structures formed thereon, to carry out optical frequency conversion (optical modulation) by quasi-phase-matching, wherein the periodic polarization-inverted structures are set and formed so that ultraviolet lights of at most 400 nm are oscillated by quasi-phase-matching when a fundamental wave is irradiated.

(14) The photorefractive effect-suppressed optical frequency conversion (optical modulation) device according to the above item (13), which contains MgO or ZnO.

(15) The photorefractive effect-suppressed optical frequency conversion (optical modulation) device according to the above item (13) or (14), wherein the polarization-inverted structures are formed in a periodic cycle of from 2 to 3 $\mu$m.

Now, the present invention will be descried in detail with reference to Examples. However, it should be understood that the present invention is by no means restricted to such specific Examples.

EXAMPLE 1

A lithium niobate crystal and a lithium tantalate crystal were irradiated with laser beams having a wavelength of 532 and a wavelength of 408 nm in a Y-axis direction, and the shape of the transmitted beam was observed by a screen or a beam profiler. As a result, the shape of the beam extended in a Z-axis direction from a circle (Gaussian distribution) due to a photorefractive effect (FIGS. 1(1) and 1(2)). Such a crystal of which the refractive index was locally changed and the beam shape was changed (photorefractive effect), was irradiated with an ultraviolet light having a wavelength of 350 nm, taken out by a filter from light emitted from a mercury vapor lamp, whereupon the deformed beam shape immediately recovered to the original non-deformed shape (circle) (FIG. 2(1)).

Further, the shape of the deformed beam recovered to the shape before the photorefractive effect occurred (FIG. 2(2)) in the same manner, when the crystal was irradiated with a light having a wavelength of 350 nm emitted from a krypton laser in such a manner that the optical path of the 350 nm light overlapped with the optical path of the above laser beam in the crystal (FIG. 2 (2)). Further, no photorefractive effect occurred when the crystal was irradiated with a light having a wavelength of 350 simultaneously with transmission of laser beams having a wavelength of 532 nm and a wavelength of 408 nm through the lithium niobate crystal.

EXAMPLE 2

Figure 4:
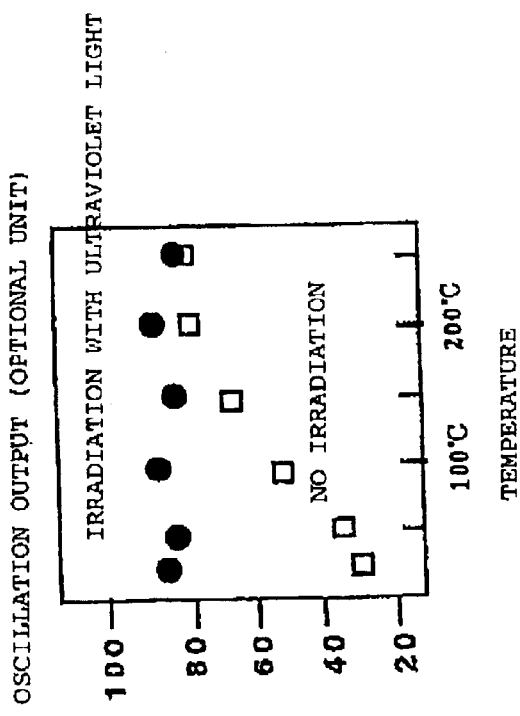
FIG. 4 is a diagram illustrating the difference in the frequency conversion effect between irradiation with ultraviolet light and a heating method.

Z-plates of a lithium niobate crystal and a lithium tantalate crystal having polarization-inverted structures formed periodically in a periodic cycle at a level of 30 micron were prepared. A fundamental wave (wavelength: 1.064 micron) of Nd:YAG laser is transmitted in a direction perpendicular to the periodic structures, a light having a wavelength of 1.5 micron is generated by optical parametric oscillation by quasi-phase-matching. However, although the oscillation efficiency is very low at room temperature due to a photorefractive effect, the oscillation efficiency increases and reaches saturation when the crystal is heated to from 100 to 200° C. This frequency conversion device was irradiated with a light having a wavelength of 350 nm taken out by a filter from ultraviolet light emitted from a mercury vapor lamp (FIG. 3), whereupon a high frequency conversion efficiency could be obtained at room temperature without heating (FIG. 4). The same effect could be obtained also when the crystal was irradiated with a light having a wavelength of 350 nm emitted from a krypton laser in such a manner that the optical path of the 350 nm light overlapped with the optical path of the above Nd:YAG laser beam in the crystal.

EXAMPLE 3

Periodic polarization-inverted structures can be formed in a crystal by forming a periodic electrode on the surface of a Z-plane of a lithium niobate crystal or a lithium tantalate crystal and applying an electric field thereto (M. Yamada, N. Nada, M. Saitoh and K. Watanabe, Appl. Phys. Lett. 62 (1993) p. 435).

When a laser beam (fundamental wave) enters into such periodic polarization-inverted structures perpendicular to the Z-axis, the wavelength of the incident light can be converted (called quasi-phase-matching). The wavelength of a light to which the light is converted is determined depending upon the refractive index dispersion of the crystal (wavelength dependency of the refractive index), the wavelength of the fundamental wave and the periodic interval between the polarization inversions.

For example, in a case where a fundamental wave is most efficiently converted to a light having a half wavelength (second harmonic wave), the relation of the above parameters can be represented by the following formula (Shintaro Miyazawa, "Kougaku Xessyo (Optical Crystal)", BAIFU-KAN CO., LTD (1995) p. 174):

(Inversion periodic cycle)=(fundamental wavelength)/((refractive index of second harmonic wave)−(refractive index of fundamental wave))/2

Figure 5:
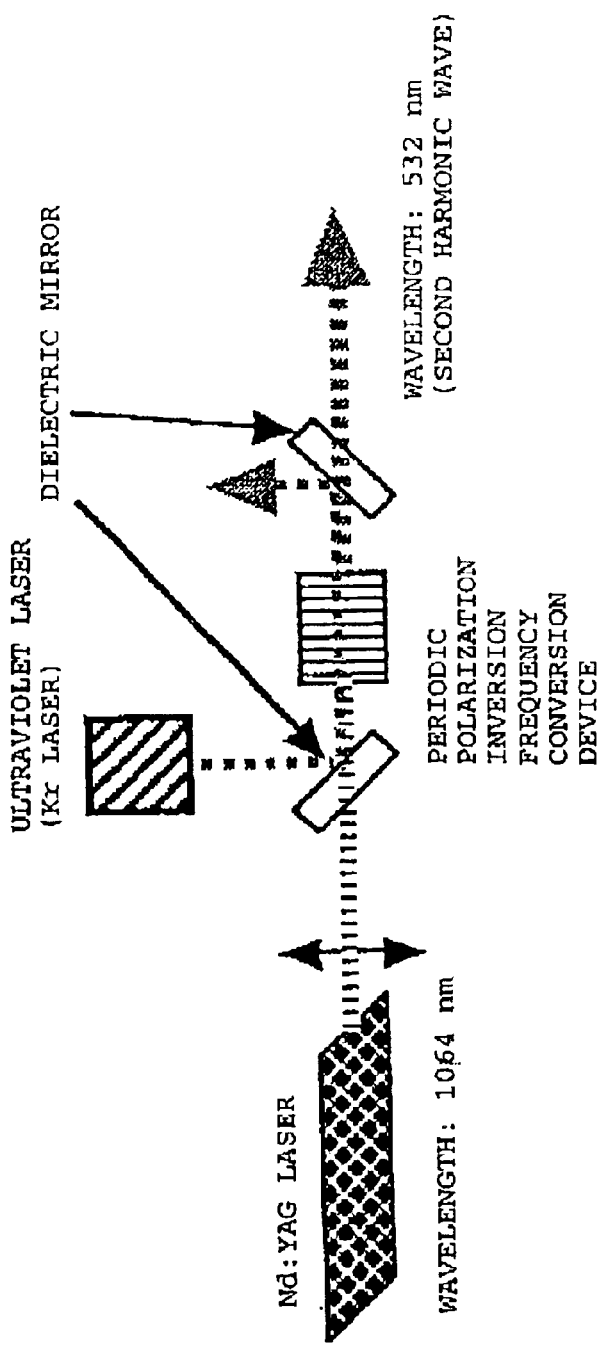
FIG. 5 is a diagram illustrating an embodiment of an optical frequency conversion method by quasi-phase-matching to avoid a photorefractive effect (No. 2).

In a case where periodic polarization-inverted structures are formed on lithium niobate to convert a fundamental wave (wavelength: 1.064 micron) of a Nd:YAG laser to a second harmonic wave (wavelength: 532 nm), the polarization inversion periodic cycle is from 6 to 7 micron (FIG. 5). However, lithium niobate tends to be affected by a photorefractive effect by the oscillated second harmonic wave although it may not be affected by the fundamental wave of a Nd:YAG laser. Thus, the oscillation efficiency tends to decrease or the oscillation may come to stop. However, as shown in FIG. 5, by making the ultraviolet laser beam overlap with the optical path in the crystal, the photorefractive effect can be suppressed, whereby oscillation of a second harmonic wave can be achieved.

EXAMPLE 4

Figure 6:
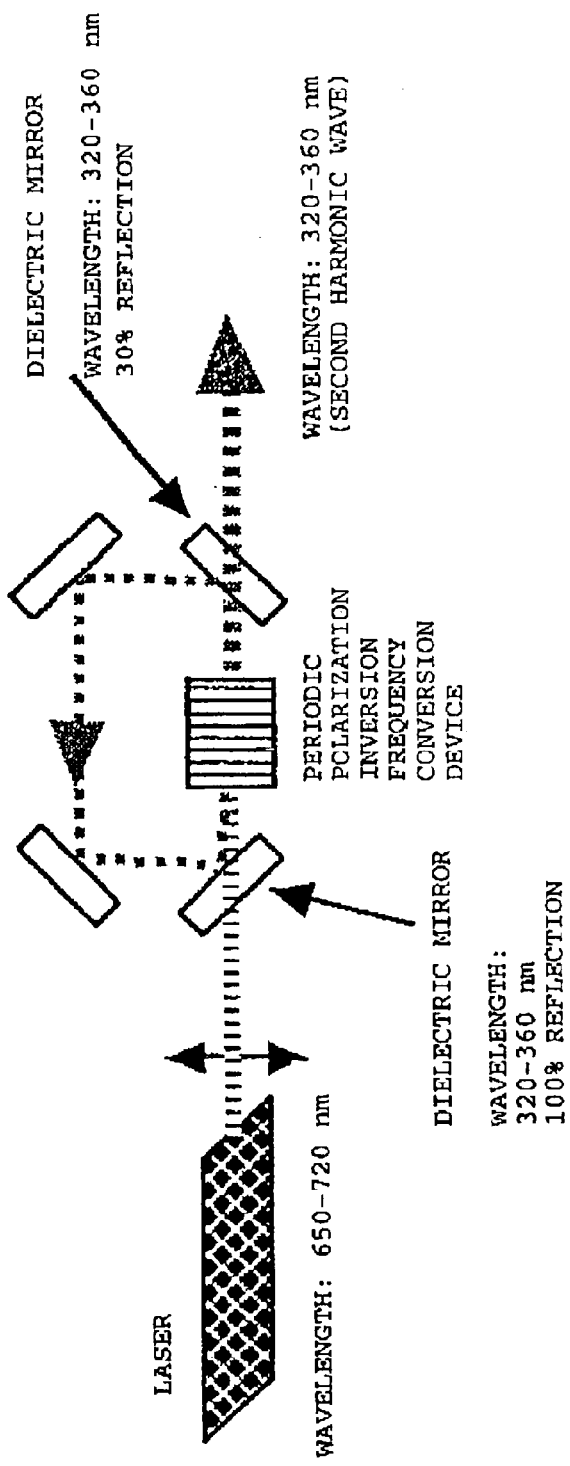
FIG. 6 is a diagram illustrating an embodiment of an optical frequency conversion method by quasi-phase-matching to avoid a photorefractive effect (No. 3).
Figure 7:
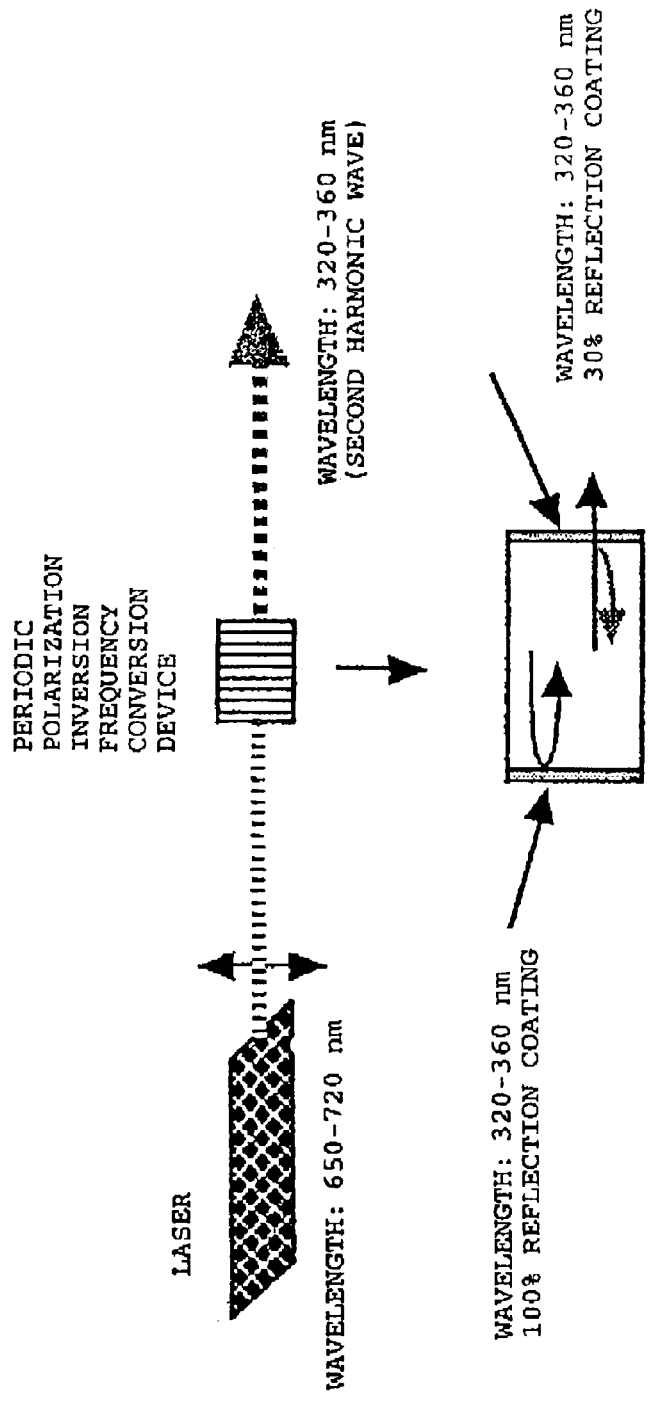
FIG. 7 is a diagram illustrating an embodiment of an optical frequency conversion method by quasi-phase-matching to avoid a photorefractive effect (No. 4).

A second harmonic wave having a wavelength of from 320 to 360 nm can be obtained when the fundamental wave has a wavelength of from 650 to 720 nm, from the relation among wavelength of the fundamental wave and the periodic interval of the polarization inversions in the above-described frequency conversion utilizing the periodic polarization-inverted structures, and the refractive index distribution of lithium niobate or lithium tantalate. In such a case, the periodic cycle of the polarization structures is at a level of from 2.5 to 3 micron. However, by an ordinary oscillation method, the photorefractive effect by the fundamental wave occurs at an incidence portion, whereby the oscillation efficiency will extremely decrease or no oscillation will take place. However, when a part of the oscillated second harmonic wave was branched by a dielectric mirror and was made to enter again into the frequency conversion device so that its optical path overlapped with that of the fundamental wave (FIG. 6), the photorefractive effect could be suppressed, and the second harmonic wave oscillation could be achieved. The same effect could be obtained when the end surface at the incidence side of a lithium niobate crystal as a frequency conversion device was subjected to 100% reflection mirror coating to the second harmonic wave, and the end surface at the exit side is subjected to 30% refection coating (FIG. 7), without using a dielectric mirror.

EXAMPLE 5

Further, a light having a wavelength one third of the fundamental wavelength (third harmonic wave) can be oscillated by utilizing periodic polarization-inverted structures of a lithium niobate crystal or a lithium tantalate crystal. The polarization inversion periodic cycle Λ is represented by the following formula:

$$\Lambda = 1/\{n(3w)/\lambda(3w) - n(w)/\lambda(w) = n(2w)/\lambda(2w)\}$$

where λ is the wavelength, n is the refractive index, and (w) is the subscript for the fundamental wave, (2w) for the second harmonic wave, and (3w) for the third harmonic wave.

Here, when a Nd:YAG laser is a fundamental wave (wavelength: 1.064 micron), the wavelength of a light generated as a third harmonic wave is at a level of 354 nm. The polarization inversion periodic cycle at this time is at a level of from 2 to 3 micron. Here, no photorefractive effect will occur by the fundamental wave or the oscillated third harmonic wave, however, various wavelengths are oscillated in the crystal, thus causing a photorefractive effect. In order for efficient oscillation, a part of the oscillated third harmonic wave was fed back to the crystal by a dielectric mirror or a reflection coating of the end surface of a frequency conversion device (FIG. 8), whereupon a third harmonic wave could be oscillated with a high efficiency.

According to the present invention, an effect of recovering functions of lithium niobate or lithium tantalate, impaired due to a photorefractive effect by frequency conversion or optical modulation, can be obtained, and a method of making oscillation of an ultraviolet light by frequency conversion possible, is provided. Particularly, the present inventors believe that when an apparatus with which an ultraviolet light can easily be utilized is developed, needs in optical processing and optical shaping can be met, and a market to a certain extent can be created, although it may not be so large as the optical communication field, thus greatly contributing to industrial development.

Further, in the optical technology, various applications are expected if a specific wavelength coherent light can be used. This is applicable to wide wavelength regions including ultraviolet, visible and infrared regions. Particularly, development of frequency conversion by quasi-phase-matching utilizing periodic polarization structures of a ferroelectric crystal is strongly desired, as an extremely high quality coherent light can be obtained with a high efficiency. By this method, miniaturization and simplification of an apparatus can be attempted, thus creating a new application.

On the other hand, lithium niobate and lithium tantalate will be used in various fields in future, and how suppress a photorefractive effect is a big problem. Heretofore, a method of adding a specific additive to increase photorefractive effect resistance of the crystal itself or a method of heating a device so that it is used in a state where no photorefractive effect will occur, has been employed. However, the method of irradiating an ultraviolet light to prevent a photorefractive effect is a totally new method, and it is expected to be applicable to various fields in future.

What is claimed is:

1. A method for treating a photorefractive effect of an optical device, which comprises irradiating an optical device comprising a lithium niobate single crystal or a lithium tantalate single crystal with an ultraviolet light having a wavelength of at least 300 nm and at most 400 nm so as to suppress and control a photo-induced refractive index change (photorefractive effect) caused on the device.

2. The method for treating a photorefractive effect of an optical device according to claim 1, wherein the optical device comprising a lithium niobate single crystal or a lithium tantalate single crystal is a device containing MgO or ZnO.

3. The method for treating a photorefractive effect of an optical device according to claim 1, wherein the optical device comprising a lithium niobate single crystal or a lithium tantalate single crystal is a device to be subjected to optical frequency conversion or optical modulation.

4. The method for treating a photorefractive effect of an optical device according to claim 1, wherein the optical device comprising a lithium niobate single crystal or a lithium tantalate single crystal is an optical frequency conversion device which has periodic polarization-inverted structures, by which optical frequency conversion is carried out by quasi-phase-matching.

5. A photorefractive effect-suppressed optical frequency conversion (optical modulation) method, which comprises using an optical frequency conversion (optical modulation) device comprising a lithium niobate single crystal or a lithium tantalate single crystal and having periodic polarization-inverted structures formed thereon, to carry out optical frequency conversion (optical modulation) by quasi-phase-matching, wherein frequency conversion (optical modulation) conditions are set so that oscillation waves in the ultraviolet region of at most 400 nm are obtained, and a part of the obtained oscillation lights of at most 400 nm are returned to the device, thereby to suppress and control the photorefractive effect.

6. The photorefractive effect-suppressed optical frequency conversion (optical modulation) method according to claim 5, wherein the optical frequency conversion (optical modulation) device is a device containing MgO or ZnO.

7. The photorefractive effect-suppressed optical frequency conversion (optical modulation) method according to claim 5, wherein the means to return the ultraviolet lights of at most 400 nm to the device is a dielectric mirror or a reflection mirror coating formed on the device.

8. The photorefractive effect-suppressed optical frequency conversion (optical modulation) method according to claim 5, wherein the frequency conversion conditions set so that ultraviolet lights of at most 400 nm are obtained, are determined by selecting periodic polarization-inverted structures of the device to be used and the fundamental wavelength.

9. The photorefractive effect-suppressed optical frequency conversion optical modulation) method according to claim 8, wherein the mode of the optical frequency conversion (optical modulation) is such that a laser beam of 1,064 nm is employed as a fundamental wave, the oscillation wave is a ultraviolet light having a wavelength of from 350 to 360 nm which is one third of the fundamental wave, and the optical frequency conversion (optical modulation) device to be used therefor is a device having polarization-inverted structures formed in a periodic cycle of from 2 to 3 μm.

10. A function-recovered optical device comprising a lithium niobate single crystal or a lithium tantalate single crystal, wherein a photo-induced refractive index change (photorefractive effect) is suppressed by irradiation with an ultraviolet light having a wavelength of at least 300 nm and at most 400 nm, whereby lost optical device functions are recovered.

11. The function-recovered optical device according to claim 10, wherein the optical device comprising a lithium niobate single crystal or a lithium tantalate single crystal is a device containing MgO or ZnO.

12. The function-recovered optical device according to claim 10, wherein the optical device comprising a lithium niobate single crystal or a lithium tantalate single crystal is a device having periodic polarization-inverted structures formed thereon, to carry out optical frequency conversion (optical modulation) by quasi-phase-matching.

13. A photorefractive effect-suppressed optical frequency conversion (optical modulation) device comprising a lithium niobate single crystal or a lithium tantalate single crystal and having periodic polarization-inverted structures formed thereon, to carry out optical frequency conversion (optical modulation) by quasi-phase-matching, wherein the periodic polarization-inverted structures are set and formed so that ultraviolet lights of at most 400 nm are oscillated by quasi-phase-matching when a fundamental wave is irradiated.

14. The photorefractive effect-suppressed optical frequency conversion (optical modulation) device according to claim 13, which contains MgO or ZnO.

15. The photorefractive effect-suppressed optical frequency conversion (optical modulation) device according to claim 13, wherein the polarization-inverted structures are set in a periodic cycle of from 2 to 31 $\mu$m.

* * * * *